United States Patent [19]
Julian

[11] Patent Number: 5,039,271
[45] Date of Patent: Aug. 13, 1991

[54] APPARATUS FOR HANDLING TRASH

[76] Inventor: Vincent D. Julian, 220 Crusader, Murray, Utah 84107

[21] Appl. No.: 495,401

[22] Filed: Mar. 19, 1990

[51] Int. Cl.⁵ .............................................. B60P 1/28
[52] U.S. Cl. ................................. 414/436; 414/419; 414/443; 414/439; 414/485; 298/17 SG; 298/24
[58] Field of Search ................ 414/419, 420, 435–437, 414/439, 482–485, 425, 469, 474–477, 332, 443, 469; 298/5, 6, 24, 25, 17 SG

[56] References Cited

U.S. PATENT DOCUMENTS

| | | | |
|---|---|---|---|
| 1,322,595 | 11/1919 | Mieklejohn | 414/439 |
| 1,606,234 | 11/1926 | Jordan | 414/440 |
| 2,059,818 | 11/1936 | Simon | 414/443 X |
| 2,964,204 | 12/1960 | Wilson | 414/439 |
| 3,092,273 | 6/1963 | Schramm | 298/5 |
| 3,189,387 | 10/1959 | Nieto | 298/5 |
| 3,891,106 | 6/1975 | Alcanzare | 414/420 X |
| 4,394,105 | 7/1983 | Mitchell | 414/485 X |
| 4,711,499 | 12/1987 | Fortin | 298/5 |
| 4,802,709 | 2/1989 | Jones | 298/6 X |

Primary Examiner—Frank E. Werner
Assistant Examiner—Brian K. Dinicola
Attorney, Agent, or Firm—M. Reid Russell

[57] ABSTRACT

Trash handling apparatus that includes a hopper mounted to tilt to a dump position off a trailer, a friction wheel to engage a wheel of the trailer and to be turned by forward movement of the trailer, reeling in a cable of a drum system so as to tilt the hopper back to an upright position after dumping where at it is locked in place until the hopper is again to be dumped.

7 Claims, 3 Drawing Sheets

APPARATUS FOR HANDLING TRASH

BACKGROUND OF THE INVENTION

1. Field of the Invention

This invention relates to trailers that are to be pulled behind a prime mover vehicle and particularly to such trailers used in the collection and disposal of garbage that include a bin that can be easily dumped.

2. Prior Art

The need for apparatus to receive, store and transport garbage for disposal in localized areas has long been recognized. Such apparatus is desirable to reduce garbage handling costs to home and apartment owners and to business operators. In part large, commercial type garbage handling vehicles frequently cannot maneuver well in the limited spaces available for trash receptacle placement.

It is well recognized that apartment and condominium complexes, for example, must frequently repair and/or replace asphalt and concrete surfaces over which large commercial garbage trucks travel simply because the weight of the vehicle, and its load, breaks up the asphalt or concrete. Also, the costs for having a garbage collection service is higher than many individuals or commercial institutions are willing to pay.

A U.S. Pat. No. 4,310,279, discloses a trash handling system wherein a trailer pulled by a prime mover such as a pick-up truck has a storage chamber to receive compacted trash and with the storage chamber capable of being tipped to discharge the contents therefrom. This system is particularly intended for use in apartment and condominium complexes and includes, additional to a hydraulically tilted storage chamber, means for picking up and emptying individual trash bins, means for crushing the trash dumped out of the trash bins and for moving the crushed material into the crushing chamber. While the patented system may be very suitable for its intended purposes, it is too costly for individual or group home owners or for the owners and operators of smaller apartment and condominium complexes.

OBJECTS OF THE INVENTION

Principal objects of the present invention are to provide a low cost and easily handled apparatus to receive, store, transport and dump trash.

Other objects are to provide trash handling apparatus that can be transported utilizing conventional vehicle apparatus such as a light pick-up truck or even an automobile.

Still other objects are to provide trash handling apparatus that can be left in position to collect trash over a period of time and that can then be towed to a dump area where it is easily dumped without the use of powered dumping equipment.

FEATURES OF THE INVENTION

Principal features of the invention include a trailer assembly having the usual trailer frame, tongue and hitch, and axle and wheels; a tiltable hopper is mounted in balanced arrangement on that trailer such that the weight of the hopper and its contents will pivot the hopper to a dump position or attitude; and a hopper recovery system powered by rotation of the trailer wheels as the trailer is moved away from the dumped materials to an upright, trash receiving position.

Other objects and features of the invention will become apparent from the following detailed description and drawing disclosing what are presently contemplated as being the best modes of the invention.

THE DRAWINGS

In the drawings:

FIG. 1 is a perspective view of the apparatus for handling trash of the invention, taken from one side at the rear and with one hopper lid shown raised and one hopper lid shown closed;

FIG. 2, a fragmentary perspective view, taken from the same side at the front;

FIG. 3, a side elevation view showing the hopper in a dump position; and

FIG. 4, a view like that of FIG. 3, but showing the hopper in an upright, trash receiving position.

DETAILED DESCRIPTION OF THE INVENTION

Figure 1:
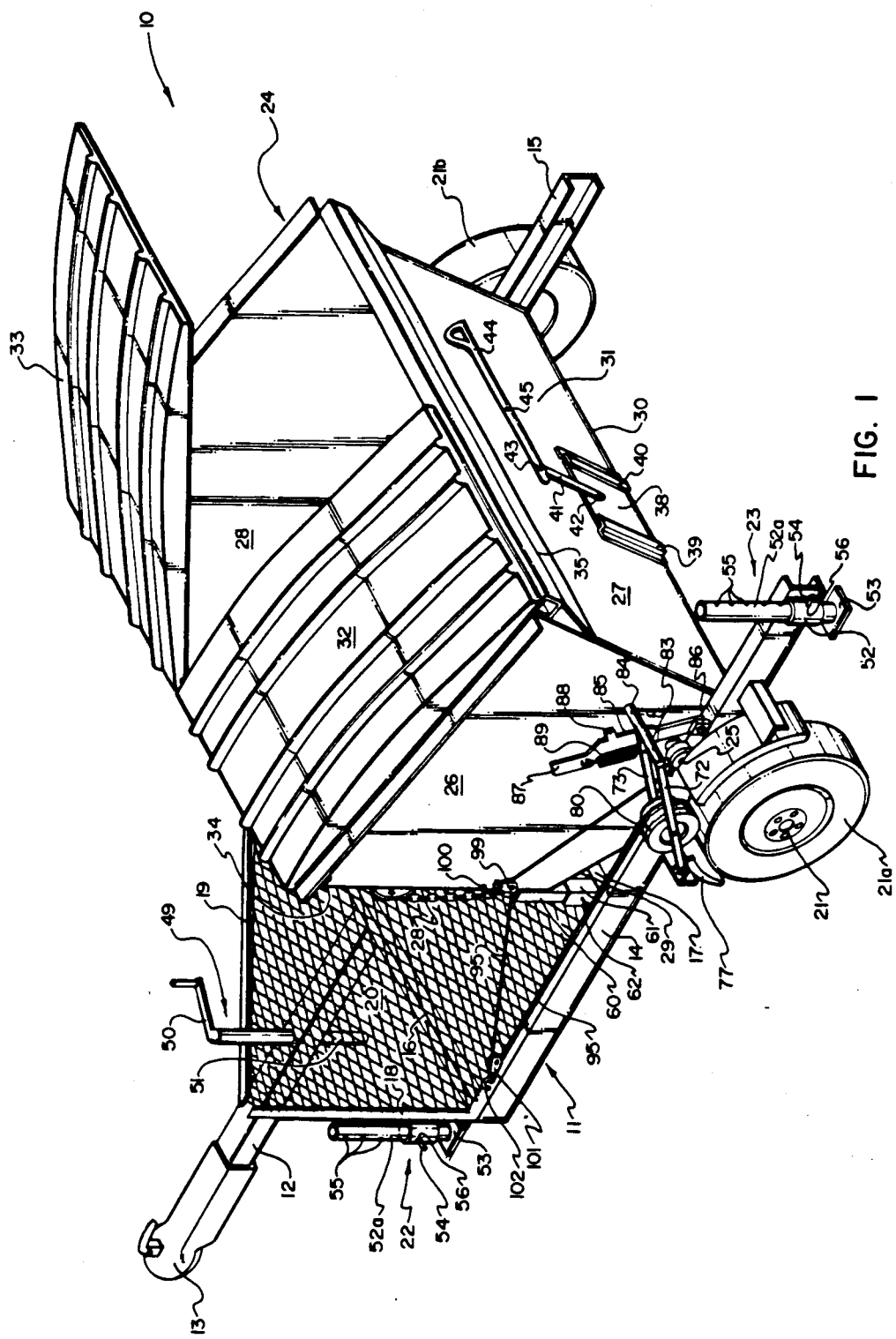

Referring now to the drawings:

In the illustrated preferred embodiment of the invention, the apparatus for handling trash, of the invention, is shown generally at 10. The apparatus includes a trailer frame 11 with a tongue 12 extending therefrom and having a standard locking ball hitch 13 on the end thereof remote from the trailer frame. The trailer frame includes a pair of spaced apart side rails 14 and 15 interconnected by spaced apart cross rails 16 and 17. The tongue 12 is fixed to and extends from the center of cross rail 16 and diagonal braces 18 and 19, respectively, interconnecting the side rails 14 and 15 to the tongue 12 intermediate its length.

A mesh platform 20, may, if desired, be provided between the side rails, diagonal braces and cross rail 17.

An axle 21 extends beneath and is fixed to side rails 14 and 15 and wheels 21a and 21b are mounted to rotate on the opposite ends of the axle. Forward and rear landing gears or stabilizers 22 and 23, respectively, are preferably provided for maintaining the trailer on a level attitude when not under tow.

A hopper 24 is positioned between the side rails 14 and 15 and has stub axles 25 projecting from the bottoms of opposite sidewalls 26 thereof which stub axles are journaled in pillow block bearings 27 that are mounted at right angles onto the aligned top surfaces of the respective side rails 14 and 15. In addition to the sidewalls 26, the hopper 24 includes a front wall 28, interconnecting the sidewalls that is inclined from its top inwardly to a sloping transition wall 29, as shown best in FIG. 3. The opposite edge of which transition wall connects to a bottom wall 30 that extends at substantially a right angle to a rear wall 31. All of which rear wall, transition and front walls interconnect the sidewalls 26 and are inclined upwardly and outwardly from the bottom wall 30 to the rear wall 31.

A pair of lids 32 and 33 are pivotally connected by a hinge 34 to the top edge of front wall 28, the lids to close the top of the hopper 24 by engagement around the top edges of sidewalls 26, front wall 28 and rear wall 31.

Figure 3:
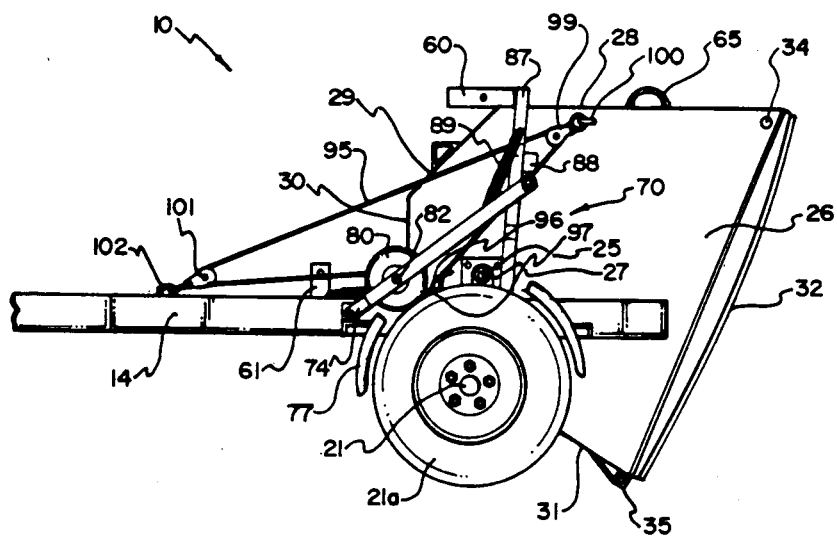

The configuration of the hopper 24, with the inclined rear wall 31 and the location of the stub axles 25 are such that the hopper 24, whether empty or loaded, tends to pivot rearwardly until a skid plate 35 that is welded or otherwise affixed across the top edge of the rear wall 31 engages the ground. The lids 32 and 33 are balanced to swing open as the hopper 24 is fully tilted, as best shown in FIG. 3.

A gate 38 is provided in rear wall 31 that slides in guides 39 and 40 to cover an opening (not shown) through the rear wall. A link 41 is pivotally connected at one end 42 to the gate 38 and has its other end pivotally connected at 43 into a handle 44 that is, in turn, pivotally connected intermediate its length at 45 to rear wall 31. The handle 44 may be pivoted, if necessary to raise the gate 38 so as to allow a user to remove the contents of hopper 24 therethrough.

The landing gears or stabilizers 22 and 23 are, as set out above, are fixed to the rear of the end rails 14 and to the diagonal brace 18, respectively, and a usual telescoping trailer stand 49 is fixed to the tongue 20. A handle 50 is fixed to a screw leg 51 of the stand 49 for use in turning the leg 51 into or out of ground engagement. Each landing gears or stabilizers 22 and 23 includes a fixed outer sleeve 52 and a telescoping post 52a with a foot 53 secured across the bottom end thereof. A pin 54 is inserted into holes 55 through a selected hole 56 that is formed in the fixed outer sleeve post 52, the pin 54 to lock the post relative to the sleeve, with the foot 53 in or out of ground engagement, as desired. When in ground engagement, the stabilizers and stand hold the trailer against tipping and undesired travel. Thus, the trailer can be left unattended in a location to receive trash and the like.

Figure 2:
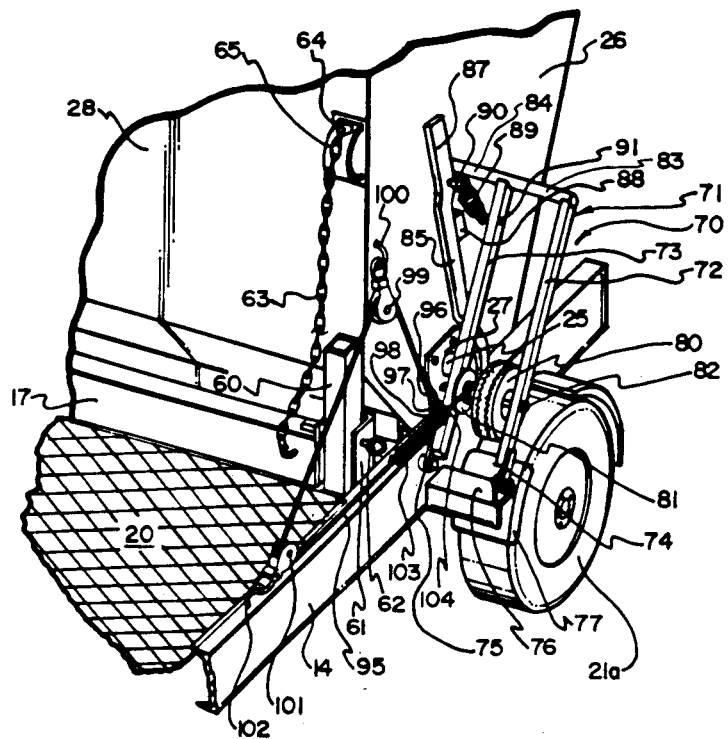

Shown best in FIG. 2, a post 60 is fixed to rear wall 28 of hopper 24 that extends downwardly therefrom to in front of bottom wall 30. A U-shaped channel 61 is fixed to extend at a right angle upwardly from side rail 14 to receive the post 60 with the post swinging into the open area of the U-shaped channel when the hopper 24 is moved to an upright attitude. A lock pin 62 is provided for insertion through holes that are formed in the opposing flanges of channel 61 and through a matching hole formed through post 60 to lock the post and channel together so as to prevent tipping of the hopper 24.

A safety chain 63 is preferably fixed on one end to cross rail 17 and is long enough for the other end to fit into a keyhole slot 64 formed in a bracket 65 that is welded or otherwise fixed to the front wall 31 of hopper 24. The installed safety chain 63 serves to prevent undesired tilting of the hopper 24.

Removal of lock pin 61 and release of safety chain 63 allows the hopper 24 to tilt to the dump position of FIG. 3, as previously described.

The hopper 24 is pivoted or tilted upwardly to its raised position using a lift mechanism 70, that is shown generally in the Figures.

Lift mechanism 70 includes a pivoted actuator frame 71 that includes a pair of spaced apart legs 72 and 73, that, as shown best in FIG. 2, are pivotally connected at their ends 74 and 75, respectively, to side rail 14 and to a step 76 that is fixed to extend outwardly at a right angle from the side rail 14. Which step 76 mounts a partial forward fender 77 that extends over an upper front portion of the trailer wheel 21a.

A friction wheel 80 and take-up reel drum 81 are fixed to an axle shaft 82 that journaled through the actuator legs 72 and 73.

A bar 83 interconnects the upper ends of actuator legs 72 and 73, includes an extension 84 that projects inwardly therefrom towards the hopper 24.

A lever arm 85, having one end pivotally connected at 86 to the side rail 14, as shown best in FIG. 1, and having a handle 87 formed at the other end includes a lug 88 projecting therefrom intermediate its length, adjacent the handle for engaging the extension 84, a lower end thereof sliding over the bar extension 84 locking the lift mechanism 70, as shown best in FIG. 2. A spring 89, that has one end secured to a post 90 that projects from the handle 87 and another end fixed to a post 91 that projects from the leg 72 of frame 71 for maintaining the bar extension against lug 88 undersurface.

A cable 95 is shown in Figures as having one end 96 fixed to an anchor 97 that is secured to extend from the side rail 14. The cable 95, is passed over a swinging pulley 99 that is suspended from an anchor 100 secured to the sidewall 26, near the front wall 28 of the hopper, the cable passing over another swinging pulley 101 that is attached to an anchor 102 located on the side rail 14. The other cable 95, end 98, as shown best in FIG. 2, is connected to a drum 81. A spring 103 is shown connected on one end to rail 14 and on its other end 104 connected to the frame lug 73 for urging the frame 71 to pivot forwardly, elevating the wheel 80 out of engagement with tire 21a, to drum 81.

Figure 4:
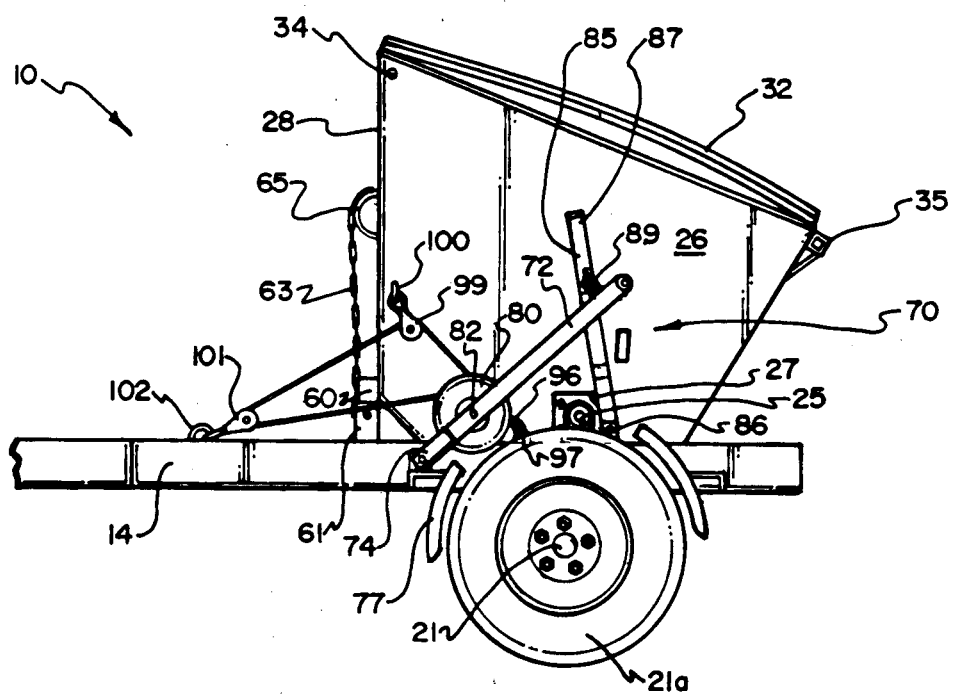

In operation, to pivot the hopper 24 from the tilted dumping position of FIG. 3, raising it to the position of FIG. 1, 2 and 4, the handle 87 is pulled to engage the extension 84, where, with continued handle rotation the frame 70 is pivoted (clockwise, as shown in the Figures) to place the friction wheel 80 in engagement with the wheel 21a of the trailer (FIG. 3). Spring 89 is thereby stretched with the undersurface of lug 88, fitted over the bar extension 84, thereby locking the friction wheel against the trailer wheel.

Thereafter, movement of the trailer frame 11 forwardly, as pulled by a prime mover (not shown) connected to the tongue 12 turns the trailer wheel 21a counter-clockwise as viewed in the Figures. This, in turn, rotates the friction wheel 80 that is in engagement with wheel 21a (clockwise, as viewed in FIG. 3), which then turns the drum 81 in the same direction, winding the cable 95 at end 98 onto that drum. As the cable 95 winds onto drum 81, cable 95 shortened, thereby moving the swinging pulley 99 towards the swinging pulley 101 and pivoting the hopper 24 top its upright position. Once the hopper 24 is in its upright position it is locked in place by fitting pin 62 through the opposite holes in channel 61 and positioning safety chain 64, as previously described.

Continued forward movement of the trailer and wheel 80 rotates frame 70 until the bar extension passes beyond the end of the lug 88 undersurface where at spring 89 separates lever arm 85 from the frame 70. The friction wheel 80 then separates from the vehicle wheel 21a and the drum 81 is free to rotate as the cable end 98 is puller therefrom in response to the next tilting of the hopper to the dump position.

With the present invention, a hopper can be filled while in an upright position. The hopper can then be easily hauled to a discharge area using even a light prime mover, where the pin 54 is removed and the safety chain 63 is released, allowing the hopper to pivot to empty the contents thereof. Thereafter, the lift mechanism 70 is manipulated, as previously described, to lock the friction wheel against a trailer wheel. The prime mover is then driven forward to move the hopper to its upright position, as previously described, and the pin 54 reinserted and the safety chain locked to secure the hopper in that upright position.

The skid plate 35 is optionally provided along the discharge lip of the hopper 24, to reduce wear resulting from forward movement of the trailer while the hopper is in the tilted dump position.

Although a preferred form of my invention has been herein disclosed, it is to be understood that the present disclosure is by way of example and that variations are possible without departing from the subject matter coming within the scope of the following claims and a reasonable equivalency thereof, which subject matter we regard as our invention.

I claim:

1. Apparatus for handling trash comprising a trailer having a frame, a tongue fixed to said trailer frame, an axle fixed to said trailer frame, and wheels journaled on opposite ends of said axle; a hopper having a front wall, a bottom, and a rear wall interconnecting a pair of side walls; means pivotally mounting said hopper on said trailer frame and operable to tilt said hopper, rearwardly of said trailer frame to a dump position; means to releasably lock said hopper to said trailer frame in an upright position to receive trash through said hopper top; and means actuated by rotation of a trailer wheel to pivot said hopper between said dump position and said upright position consisting of an actuator frame that is pivotally connected to said trailer frame, an actuator axle carried by said actuator frame, a friction wheel journaled on said actuator axle and movable by said actuator frame into engagement with the periphery of an adjacent one of said trailer wheels, a take-up reel drum secured on said actuator axle and rotatable with said friction wheel, a first pulley arranged on one of said hopper sidewalls adjacent the front wall, a second pulley arranged on said trailer frame between said take-up reel drum and the trailer tongue, and a cable having one end fixed to said trailer frame and having the other end fixed to said take-up reel drum, said cable being passed over said first and second pulley.

2. Apparatus as in claim 1, wherein the trailer frame includes a pair of spaced apart side rails and a plurality of cross rails interconnecting said side rails.

3. Apparatus as in claim 2, wherein the means pivotally mounting the hopper comprises a respective stub axle projecting from each of the sidewalls of said hopper; and a respective bearing fixed to each of said side rails and journaling one of said stub axles.

4. Apparatus as in claim 3, wherein the means to releasably lock the hopper to the trailer frame in an upright position to receive trash through the top thereof comprises a post fixed to the front wall and projecting downwardly therefrom beyond the hopper bottom; a channel member having a pair of spaced apart flanges fixed to the trailer frame and receiving said post between said flanges when the hopper is upright; and a locking pin that is inserted through both the flanges of said channel member and said post.

5. Apparatus as in claim 1, further including a lever pivotally connected to the trailer frame; a lug extending from said lever to engage the trailer frame so as to hold the friction wheel against said adjacent trailer wheel; and a spring interconnecting said trailer frame and said lever.

6. A hopper pivoting arrangement for a trailer having a trailer frame, a tongue fixed to the trailer frame, an axle fixed to the trailer frame, trailer wheels journaled on opposite ends of the axle, a hopper having a front wall, a bottom, and a rear wall interconnecting a pair of side walls pivotally mounted across said trailer frame to tilt rearwardly of the trailer frame to a dump position that is reached by rotation of one of the trailer wheels to pivot the hopper from the dump position to the upright position comprising, an actuator frame that is pivotally connected to the trailer frame; an actuator axle carried by said actuator frame; a friction wheel journaled on said actuator axle and movable by said actuator frame into engagement with the periphery of the said one of the trailer wheels; a take-up reel drum secured on said actuator axle and rotatable with said friction wheel; a first pulley arranged on one of said hopper side walls adjacent said front wall; a second pulley arranged on said trailer frame between said take-up reel drum and the trailer tongue; and a cable having one end fixed to said trailer frame and having the other end fixed to said take-up reel drum, said cable being passed over said first and second pulleys.

7. A hopper pivoting arrangement as in claim 6, further including a lever pivotally connected to the trailer frame; a lug extending from said lever to engage the trailer frame so as to hold the friction wheel against the said one of the trailer wheels; and a spring interconnecting said trailer frame and said lever.

* * * * *